(No Model.)

F. A. NICKERSON.
DIE FOR THE MANUFACTURE OF ARTICLES FROM PLASTIC MATERIALS.

No. 285,059. Patented Sept. 18, 1883.

Witnesses.
G. N. Bowers
R. F. Hyde

Inventor
Fred. A. Nickerson
by Henry A. Chapin
Atty

United States Patent Office.

FRED. A. NICKERSON, OF SPRINGFIELD, MASSACHUSETTS, ASSIGNOR TO THE DICKINSON HARD RUBBER COMPANY, OF SAME PLACE.

DIE FOR THE MANUFACTURE OF ARTICLES FROM PLASTIC MATERIALS.

SPECIFICATION forming part of Letters Patent No. 285,059, dated September 18, 1883.

Application filed May 4, 1883. (No model.)

*To all whom it may concern:*

Be it known that I, FRED. A. NICKERSON, a citizen of the United States, residing at Springfield, in the county of Hampden and State of Massachusetts, have invented new and useful Improvements in Dies for the Manufacture of Articles from Plastic Material, of which the following is a specification.

This invention relates to improvements in the construction of dies for use in the manufacture of articles from plastic material; and it consists in making said dies of two pieces of metal capable of being inseparably united by pressure, one part constituting the base and rim of the die and capable of resisting the pressure force to which such dies are subjected while in use, and having within it a die-pocket of peculiar form, and the other part constituting the die-face and capable of being forced and expanded into said die-pocket, and thereby united to said base, and of having ornamental designs formed on or in its face by the pressure of a hard former against it.

Figure 3:
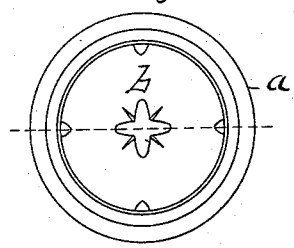
Figure 4:
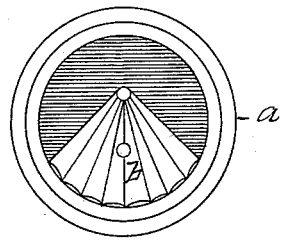
Figure 2:
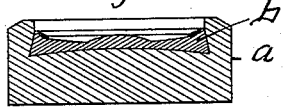
Figure 1:
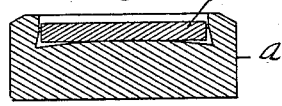

In the drawings forming part of this specification, Figure 1 is a sectional view of a die-base and of a die-face prepared ready for being united, and Fig. 2 is a sectional view of the parts shown in Fig. 1 after having been forced together, both of which views illustrate a die embodying my invention. Figs. 3 and 4 are plan views of finished dies.

In the drawings, $a$ is the die-base, made of such form as adapts it to the press in which it is to be used, and having formed therein a die-pocket, the border of which is cut under, so that the diameter of said pocket across the bottom of it is greater than it is above the bottom, and the latter is made preferably somewhat convex in form, as shown, although the bottom may be made flat. A bottom of convex form conduces to the proper expansion of the die-face in the pocket, when pressure is applied for that purpose, with greater ease. The border of the die-pocket from the edge of the same down to the face of the die is made of such form as will admit of easily removing the article therefrom which has been forced into it for the purpose of giving it the die form.

The die-face is indicated by the letter $b$, and is made from metal, such as brass or hard white-metal or copper, or any suitable metal which is capable, by reason of its ductility, of being by pressure force made to conform to and fill the said pocket in the base $a$, and upon which ornamental figures can be formed, either raised or depressed, or both, by forcing a figure-die upon it.

The die-face is made as shown in Fig 1, so that it will easily drop into the pocket in the base $a$, and the two pieces are placed in a suitable press, provided with a plunger or a die to be driven against the die-face $b$, and force being applied, the form of the part $b$, as it appears in Fig. 1, is made to take the form shown in Fig. 2, wherein it entirely fills the pocket in the base $a$ and is solidly and inseparably united thereto, so that said two parts jointly serve practically all the purposes of an expensive hardened-steel die for molding articles of plastic material.

Dies made in the manner above described are very much less expensive than those made heretofore from steel, and for the purposes of manufacturing plastic-material objects answer the same purpose.

What I claim as my invention is—

1. The within-described improved die, consisting of the base $a$, having a die-face pocket therein whose diameter is greatest near its bottom, the latter being of convex form, and the die-face $b$, united to said base by being forced into and made to expand within said pocket, substantially as set forth.

2. The within-described improved die, consisting of the base $a$, having a die-face pocket therein whose diameter is greatest near its bottom, and the die-face $b$, united to said base by being forced into and made to expand within said pocket, substantially as set forth.

FRED. A. NICKERSON.

Witnesses:
H. A. CHAPIN,
G. N. BOWERS.